Figure 1:
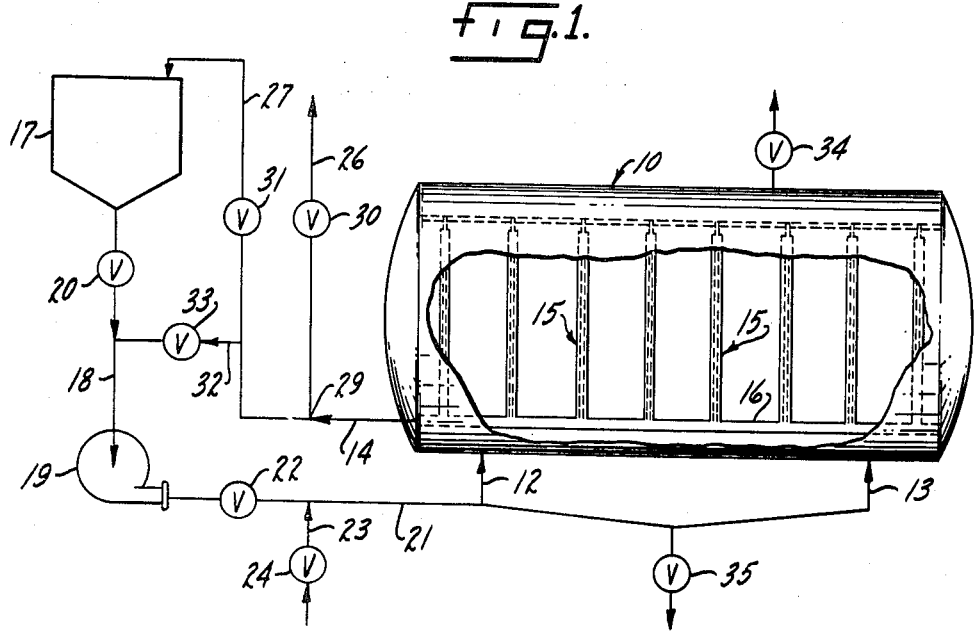

May 10, 1966

J. A. LEVENDUSKY 3,250,703

PROCESS AND APPARATUS FOR REMOVING
IMPURITIES FROM LIQUIDS

Filed March 8, 1963

INVENTOR.
Joseph A. Levendusky,
BY
Byron, Hume, Groen & Clement
Attorneys.

United States Patent Office 3,250,703
Patented May 10, 1966

3,250,703
PROCESS AND APPARATUS FOR REMOVING
IMPURITIES FROM LIQUIDS
Joseph A. Levendusky, Bayonne, N.J., assignor to Union
Tank Car Company, Chicago, Ill., a corporation of
New Jersey
Filed Mar. 8, 1963, Ser. No. 263,999
17 Claims. (Cl. 210—24)

This application is a continuation-in-part of applicant's copending application Serial No. 133,670, filed August 24, 1961, now abandoned and assigned to the assignee of the present application.

This invention relates to a filter, method and apparatus for purifying fluids and, more particularly, to a filter, method and apparatus for removing dissolved and undissolved impurities from liquids, such as water and the like.

Basically, the problems encountered in purifying water are exemplary of those present in the art of fluid purification. Water to be purified will generally contain two types of impurities—dissolved impurities and undissolved impurities. The following are illustrative of undissolved materials which may be undesirably present in the water, depending upon the intended use of the water: copper, nickel, iron, silica, copper and iron oxides, and other similar materials. The copper, nickel, iron and silica are often colloidal size particles. Dissolved materials which may be undesirably present in the water, depending upon the intended use of the water, include: soluble silicas, chloride compounds, compounds of calcium and magnesium, such as the sulfates and bicarbonates, and the like.

One of the principal methods employed to remove undissolved impurities from water, or other fluids, is to pass the water through a mechanical filter means, such as a filter screen, filter cloth, filter leaf or the like. As is well known in the art, such mechanical filter means may be made of wire, cloth, natural or synthetic fiber-wound elements, such as cotton-wound or nylon-wound elements, paper and the like. The term "filter screen," as used hereinafter, is intended to embrace all such mechanical filtering means.

There are, however, inherent problems in the use of a filter screen to remove undissolved impurities from a fluid stream. For example, the filter screen tends to become clogged with the undissolved impurities. Furthermore, the filter cake of undissolved impurities may not build up uniformly on the filter screen. To obviate these undesirable consequences, pre-coat or filter-aid mediums, such as cellulose, asbestos, diatomaceous earth, powdered coal, talc, charcoal, and magnesia have been used in conjunction with the filter screen. The pre-coat medium prevents the filter screen from becoming clogged and assures uniform build-up of the filter cake on the filter screen, which are essential to the efficient operation of the filter screen.

The usual method of applying the pre-coat medium to the filter screen of a filter tank is to prepare a slurry by suspending the pre-coat medium in water and circulating the slurry through the filter screen. The pre-coat medium is uniformly deposited upon the upstream surface of the filter screen. The pre-coat particles are maintained on the filter screen by the pressure differential created by the liquid moving through the filter screen or by the combined effect of this pressure differential and the force of gravity, depending upon the position of the filter screen. After a pre-coat layer of sufficient thickness has been deposited on the filter screen, the flow of slurry to the filter tank is terminated and the water to be treated is introduced into the filter tank. The water flowing through the filter tank is, at all times, at such a pressure that the pre-coat medium will remain on the filter screen. An alternative method of adding the pre-coat medium is to suspend it in the stream of untreated water as the filtration process commences.

With respect to removing the dissolved impurities from water or other fluids, the use of ion exchange resins has become well known in the art. These ion exchange resins are granular or bead-like synthetic resin particles in the size range of 20 to 50 mesh, hereinafter sometimes referred to as "large bead" resin particles. When contacted by a fluid, ion exchange resin particles release ions to the fluid while simultaneously capturing other free ions in the fluid. Accordingly, when water is passed through a bed or beds of these ion exchange resin particles, the ions of the dissolved impurities are captured by the ion exchange resin particles and replaced by desirable ions released by the ion exchange resin particles to the water. Therefore, the undesirable ions in the water are exchanged for desirable ions given off by the resin particles.

In a typical process for removing dissolved impurities from water, commonly referred to as a demineralization process, the untreated water containing the dissolved impurities, such as ionized salts or electrolytes, is passed through a bed of large bead cation exchange resin particles. As a result of the ion exchange between the cation exchange resin particles and the water, the salts are changed to the corresponding acids. The water is then passed through a bed of large bead anion exchange resin particles where an ion exchange reaction removes the acids. In this manner substantial reduction of the dissolved impurities in the water is achieved. The same results can be effected by passing the water through a bed of mixed large bead cation and anion resin particles, as the same fundamental reaction takes place within the mixed bed; namely, the cation resin particles change the salts to the corresponding acids and the anion resin particles remove the acid to produce a purified water.

Commercially manufactured large bead resin particles in the size range of 20 to 50 mesh may have mixed therewith a small amount of "fines," i.e., resin particles in the size range of 60 to 100 mesh or smaller. These "fines," which constitute less than 1% by weight of the large bead resins, are generally separated from the large bead resins prior to using the large bead resins. However, if allowed to remain with the large bead resin particles, the "fines" will be washed from the bed of large bead resins during the treating cycle or regeneration cycle by virtue of their small size.

In certain environments it is desirable that the undissolved and dissolved impurities not have a concentration exceeding in the order of about 20 parts per billion (p.p.b.). For example, in a steam generating system, such as employed by public utilities, though the water may have only small amounts of dissolved and undissolved impurities, e.g., in the order of 10 parts per million (p.p.m.) or less, these impurities cause undesirable pitting and fouling of the delicate turbine blades and scaling in the boiler tubes by virtue of the superheated temperature and high pressure environment. Accordingly, it is necessary to further reduce the concentration of these impurities.

Presently, the removal of such impurities from water is sought by the cumulative effect of standard screen filters, to remove the undissolved solids, and ion exchange resin units, to remove the dissolved impurities. Ion exchange resin units per se are also employed. The ion exchange resin units comprise deep beds, from 30 inches to 40 inches in depth, of large bead ion exchange resin particles in the size range of 20 to 50 mesh. Until the present invention, such beds were considered to provide the optimum in reaction rate and flow to effect the removal of trace impurities from the water.

Present systems, therefore, require a screen filter unit to remove undissolved materials and an ion exchange bed unit or units to remove the dissolved solids. An ion exchange bed unit is a relatively large installation, representing a large capital expenditure and involving complex operational techniques. Furthermore, the percentage of impurities removed by such systems is not high, attesting to the inefficiency of this impurity removal process.

It is an object of the present invention to provide a filter, method and apparatus for removing impurities from a fluid.

It is a further object of the present invention to provide an improved filter, method and apparatus for removing dissolved and undissolved impurities from a fluid.

It is a still further object of the present invention to provide an improved filter, method and apparatus for removing trace undissolved and dissolved impurities from water.

It is another object of the present invention to provide a filter, method and apparatus for removing dissolved and undissolved impurities from a liquid, said filter, method and apparatus being easy to operate and requiring minimal capital expenditure.

These and other objects more apparent hereinafter are accomplished in accordance with the present invention by passing a fluid through a filter comprising a filter screen pre-coated with a layer of ion exchange resin particles in the size range of about 60 to 400 mesh, these resin particles being hereinafter sometimes referred to as "finely divided" resin particles. The pre-coat layer of finely divided resin particles is a few inches thick or less as will be explained more fully hereinafter. By virtue of the present invention the separate, costly and complex installations heretofore employed are no longer necessary and there is further provided a system wherein improved purification of the fluid is obtained. The ion exchange resin particles in the size range of about 60 to 400 mesh may be used in combination with known filter-aid mediums, such as cellulose, diatomaceous earth and the like. The finely divided resin particles may be deposited and maintained upon the filter screen in any known manner and also prevent clogging of the filter screen and aid in a uniform build-up of the filter cake of undissolved solids.

The finely divided ion exchange resin particles employed in the present invention not only combine the mechanical properties of a pre-coat medium and the chemical properties of the large bead ion exchange resins but, in addition, coact with the filter screen to unexpectedly enhance impurity removal. Depending upon the particular contaminants to be removed, the finely divided ion exchange resin particles may be anion or cation exchange resins or mixtures thereof.

Thus, in accordance with the present invention improved removal of impurities from water may be achieved to produce a high purity water suitable for boiler feed water, the manufacture of fine chemicals, pharmaceuticals, plastics, foodstuffs, fine paper, and photographic film, use in steam driven generators and the like.

Figure 2:
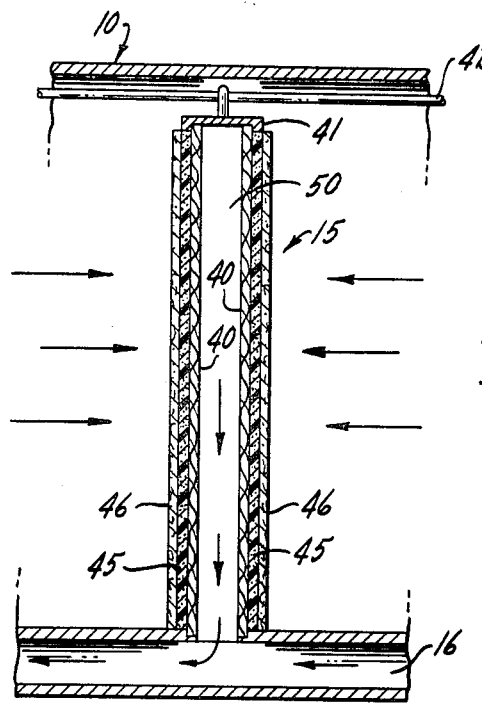

The invention, both as to its organization and method of operation, taken with further objects and advantages thereof, will best be understood by reference to the following description taken in conjunction with the accompanying drawings, in which:

FIG. 1 is a schematic representation of a filtering system embodying the features of the present invention, the filter tank of the system being partially cut away to illustrate the filters in the filter tank; and FIG. 2 is an enlarged cross-sectional view of one of the filters illustrated in FIG. 1, illustrating the filter screen, the pre-coat layer, and a filter cake.

Referring to the drawings, and more particularly to FIG. 1, there is illustrated schematically a filter system for removing dissolved and undissolved impurities from water in accordance with the present invention. Although the present invention will be discussed in detail with respect to the purification of water, the present invention has application to the purification of gases and other liquids. For example, the present invention has application to the removal of formic acid from formaldehyde, the removal of color bodies and ash from sugar solutions, the conversion of potassium ions to sodium ions in wines, the purification of such gases as sulphur dioxide, and to the removal of water vapor, acid vapor, and sulphur dioxide from air.

The filter system includes a filter tank, indicated generally by reference numeral 10, having inlet lines 12 and 13 and an outlet line 14. Mounted within the filter tank 10 are a plurality of filters, indicated generally by reference numerals 15 and which will be described in detail hereinafter. The filters 15 are connected to an outlet header 16 which in turn is connected to the outlet line 14. The water to be treated passes into the filter tank 10 via lines 12 and 13 and through the filters 15, is collected in the outlet header 16 and leaves the filter tank 10 through the outlet line 14.

A water slurry of the particular pre-coat medium employed in the present invention, finely divided ion exchange resin particles in the size range of about 60 to 400 mesh, is stored in a pre-coat tank 17. A slurry line 18, controlled by a slurry valve 20, connects the pre-coat tank with a slurry pump 19. A transfer line 21 connects the pump 19 with the inlet lines 12 and 13 of the filter tank 10. A transfer valve 22 adjacent the pump 19 and in the transfer line 21 controls the passage of slurry or liquid from the pump 19.

The water to be treated enters the filter system through feed line 23 having an intake control valve 24. The feed line 24 is connected to the transfer line 21 between the control transfer valve 22 and the inlet line 12.

The outlet line 14 from the filter tank 10 is connected to a service line 26 and a pre-coat return line 27 at a T-juncture indicated by reference numeral 29. The service line 26 is connected to service units not shown, such as a steam generator and the like, and has a service valve 30. The pre-coat return line 27 is connected to the pre-coat tank 17 and has a return valve 31 to control the flow of slurry back to the pre-coat tank 17.

A bridge line 32 with a bridge valve 33 interconnects the pre-coat return line 27 and the slurry line 18. The filter tank 10 is equipped with a vent valve 34 and a drain valve 35.

Referring to FIG. 2, each filter 15 comprises two spaced filter screens 40 held at their upper edges by a bracket 41 which is attached to a longitudinally extending brace 42 suitably mounted in the filter tank 10. A peripheral seal (not shown) closes the outer edges of the filter screens 40 to form a chamber 50 therebetween which directly communicates with the outlet header 16. Thus, liquids entering the filter tank 10 must pass through the filter screens 40 into the chamber 50 and are withdrawn from the filter tank 10 through the outlet header 16. The flow of the liquid through the filter tank 10 is represented by the arrows in FIG. 2.

During the pre-coating step a pre-coat layer 45 of finely divided ion exchange resin particles in the size range of about 60 to 400 mesh is deposited upon the upstream sides of the filter screens 40, i.e., the sides where the water is introduced into the filter screens 40. Similarly, during the filtering step a filter cake 46 builds up within and on the upstream side of the pre-coat layer 45.

In preparing the filter system for operation the initial step is to pre-coat the filter screen 40. To these ends, the filter tank 10 is filled with low impurity water, such as demineralized water. A slurry of pre-coat medium and demineralized water is prepared in the pre-coat tank 17, the pre-coat medium being ion exchange resin particles in the size range of about 60 to 400 mesh. It is preferable to employ ion exchange particles in the size range of about 100 to 400 mesh, the most preferred range being 200 to 400 mesh. It is further preferred that a major portion of the ion exchange particles comprise, on a weight basis, particles in the size range of 100 to 400 mesh, most preferably 200 to 400 mesh.

During the pre-coating step all the valves are closed, except the slurry valve 20, the transfer valve 22 and the return valve 31. The pre-coating step is initiated by starting the pump 19, thereby drawing the resin pre-coat slurry from the pre-coat tank 17 and through the slurry line 18 to the pump 19. The slurry is forced by the pump 19 through the transfer line 21 and the inlet lines 12 and 13 into the filter tank 10. The pressure of the incoming slurry forces the demineralized water in the filter tank 10 through the filters 15 and the chamber 50 and out of the filter tank 10 via the outlet header 16 and the outlet line 14. This demineralized water enters the pre-coat tank 17 through the return line 27.

As the cycling continues the pre-coat slurry is brought into contact with the upstream surfaces of the filter screens 40 of the filters 15. The ion exchange resin particles of the pre-coat medium are separated from the slurry and deposited as the pre-coat layer 45 upon the upstream surfaces of the screens 40. Because of the fine size of the ion exchange resin particles in the pre-coat medium, a small pressure differential across the filter screens 40 suffices to maintain the resin pre-coat layer 45 in place. The slurry is circulated through the filter system in this manner until a sufficient depth of the resin pre-coat layer 45 is deposited upon the upstream surface of the filter screens 40. The apertures of the filter screens 40 must, of course, be small enough to cause the finely divided resin particles to deposit upon the upstream side and form the pre-coat layer 45.

The thickness of the pre-coat layer 45 may be greater than a few inches, but it is preferred that the layer 45 have a thickness in the range of about $\frac{1}{16}$ to 2 inches, more preferably about $\frac{1}{8}$ to 1 inch, and most preferably $\frac{1}{8}$ to $\frac{5}{8}$ inch.

The pre-coating step is terminated by closing the valve 20 and the return valve 31 and opening the bridge valve 33. The pump 19 is kept running until the recycle stream is clear. The filter system is now ready to be used to treat the feed water.

The service run is begun by closing the bridge valve 33 and the transfer valve 22 and opening the service valve 30 and the feed valve 24. This step is preferably timed to maintain sufficient pressure in the system to assure retention of the pre-coat layer 45 on the filter screens 40. In this manner, untreated water enters the filter system through the feed line 23 and passes through the transfer line 21 and the inlet lines 12 and 13 into the filter tank 10. The pressure of the incoming untreated water forces it through the resin pre-coat layers 45, the filter screens 40 and 40', the chamber 50 and the outlet header 16.

As the untreated water passes through the pre-coat layer 45, an ion exchange reaction takes place to remove dissolved impurities from the water. In addition, undissolved impurities are removed from the untreated water by virtue of the water passing through the filter screens 40 and the pre-coat layer 45 of finely divided ion exchange resins. Filter cake 46, consisting of the undissolved impurities, builds up within and on the pre-coat layer 45 as the process continues. The purified or treated water flows from the chamber 50 through the outlet header 16 and the outlet line 14 to the service line 26. The purified water is directed to a supply tank or suitable equipment by the service line 26.

Eventually the resins will become exhausted and must be regenerated or discarded. At this time the filtering step is stopped by closing the intake valve 24 and the service valve 30. The vent valve 34 and the drain valve 35 are opened to drain the filter tank 10. The finely divided ion exchange resin particles are recovered from the drain water and regenerated. The filters 15 are washed by an internal washing system not described or shown. Another charge of ion exchange resin particles in the size range of about 60 to 400 mesh is then placed in the pre-coat tank 17 and the process of pre-coating and filtering described in detail hereinbefore is repeated. Preferably several charges of resin particles are available to decrease down time and allow re-starting the process while the exhausted resins are being separately regenerated.

Typical solid cation exchange resin particles which may be employed in the present invention are the divinylbenzene-styrene copolymer type, the acrylic type, the sulfonated coal type and the phenolic type. These may be used in the sodium, hydrogen, ammonium or hydrazine form, for example. Typical solid anion exchange resin particles that may be employed in the present invention are the phenol-formaldehyde type, the divinylbenzene-styrene copolymer type, the acrylic type and the epoxy type. The anion resin particles may be used in the hydroxide or chloride form, for example. These anion and cation resin compositions are well known in the art in the large bead form, i.e., in the size range of 20–50 mesh. For example, such resins are sold in the large bead form under the tradenames of Amberlite IR–120 and Amberlite IRA–400, manufactured and sold by Rohm & Haas Company, and Nalco HCR and Nalco SBR–P, sold by Nalco Chemical Company. The finely divided resins employed in the present invention are made by grinding these well known large bead resins to the desired size range. The finely divided resin particles are regenerated and washed prior to use as with the large bead resin particles.

The filtering system described hereinbefore represents one embodiment or possible arrangement of the filter screens. The filter screens 40 may be cylindrical, conical or other shapes without departing from the spirit of the present invention. Furthermore, though in this embodiment a pre-coat slurry was independently circulated to pre-coat the filter screens 40 in advance of the introduction of the feed liquid, the finely divided resin particles may be mixed directly into the feed liquid at the start of the run with similar results. In addition, after a pre-coat layer has been formed additional finely divided resin particles may be added to the feed liquid prior to the feed liquid passing through the pre-coat layer and filter screen.

Though the present invention is applicable to fluids containing any amount of impurities, it is preferably employed to treat water containing less than 10 p.p.m. of dissolved impurities and less than 2 p.p.m. of undissolved impurities.

Some of the advantages derived from the present invention are apparent from the following examples.

Example I

The overall purification system was substantially the same as the system illustrated in FIG. 1 and described in detail hereinbefore in that it comprised a filter tank equipped with suitable vents and drains, a pre-coat tank, a pump, a slurry line interconnecting the pre-coat tank with the pump, a transfer line interconnecting the pump with inlet lines into the filter tank, and an outlet line from the filter tank which was connected with a pre-coat return line which, in turn, leads back to the pre-coat tank. A feed line for untreated water was connected to the transfer line and a service line was connected to the outlet line. In addition, a bridge line interconnected the pre-coat return line with the slurry line. All lines had suitable valves.

Within the filter tank itself was a ten square foot leaf filter connected to an outlet header. The outlet header was connected to the outlet line. The filter screens of the leaf filter were 24 x 110 Dutch Weave wire cloth.

Approximately 5 pounds of strongly basic anion exchange resin particles in the size range of 100 to 400 mesh and 2.5 pounds of strongly acidic cation exchange resin particles in the size range of 100 to 400 mesh were placed in the pre-coat tank. The anion resin particles were in the hydroxide form and the cation resin particles were in the hydrogen form. The finely divided resin particles were of the styrene-divinylbenzene copolymer type. About 95% by weight of the anion and cation finely divided resin particles were in the size range of 100 to 200 mesh. The finely divided resin particles were mixed in tne pre-coat tank with demineralized water to make a slurry with a concentration of approximately 90 to 95% by volume of finely divided resin particles to water. The filter tank was filled with demineralized water. All of the valves were closed.

The pre-coating step was initiated by starting the pump and opening the slurry line valve, the transfer line valve and the pre-coat return line valve. The action of the pump caused the pre-coat slurry to circulate at the rate of 2 g.p.m./sq. ft. of filter screen area through the slurry line, the pump, the transfer line, and the inlet lines into the filter tank. The pressure created by the pump forced the slurry against the upstream surface of the filter screens where the finely divided resin particles were deposited. The water continued through the filter screen into the outlet header, through the outlet line to the pre-coat return line and back into the pre-coat tank. The pre-coat return line valve was then closed and the bridge line valve opened, thus allowing the liquid to circulate without the addition of new resin material. At the end of this operation a pre-coat layer of about 0.75 lb./sq. ft. of filter screen had been deposited upon the upstream side of the filter screen. This comprises 0.5 lb. of anion resin/sq. ft. of filter screen and 0.25 lb. of cation resin/sq. ft. of filter screen. The pre-coat layer was about 1/4"–3/8" thick.

After approximately five minutes the recycle stream was clear of resin particles. Untreated water was then introduced into the system at a flow rate of 2 g.p.m./sq. ft. of filter screen by opening the feed line valve and simultaneously closing the transfer line valve and the bridge line valve. At the same time the service line valve was opened. The untreated water, which contained between 2 and 4 parts per million of dissolved electrolyte impurities, such as chlorides and sulfates of sodium, calcium and magnesium, and .05 to 3 parts per million of undissolved silica impurities, was thus sent through the feed line and the inlet lines into the filter tank. The water was passed through the pre-coat layer and through the filter screen and then through the outlet header and the outlet line to the service line. The pressure drop across the filter screen and pre-coat layer was about 2 p.s.i. Undissolved contaminants were removed in and on the resin pre-coat layer to form a filter cake.

When the quality of the water leaving the filter indicated that the finely divided resin pre-coat medium had become exhausted, the run was terminated by closing the intake valve and the service valve. The vent valve and the drain valve were then opened and the filter screens were washed. The resins were recovered from the drain water. A new charge of resin was then introduced into the pre-coat tank the cycle repeated.

The results of the run, in which approximately 10,000 gallons of water were treated, showed that 70–90% of the electrolyte impurities were removed and 60–80% of the silica was removed. Dissolved and undissolved iron was also removed from the water.

*Example II*

In this example, a comparison was made of the following purification systems:

System A—A conventional mixed-bed with large bead resins;
System B—A shallow mixed-bed with large bead resins;
System C—A filter screen pre-coated with large bead resins;
System D—A filter screen pre-coated with finely divided resins; and
System E—A filter screen pre-coated with cellulose.

A plurality of tests were made for each purification system. With respect to Systems A and B conventional apparatus was employed and the influent water was passed downwardly through beds of mixed large bead anion and cation resin particles. For Systems C, D and E apparatus similar to that described in Example I was employed, except that the filter screens were cotton-wound annular filters having an effective porosity of 2 microns. The pre-coat mediums employed in Systems C, D and E were deposited on the upstream side (exterior surface) of the filters in the manner described in detail in Example I.

The cation and anion exchange resin particles employed in all of the tests were of the styrene-divinyl-benzene copolymer type. The cation resin particles were in the hydrogen form, while the anion resin particles were in the hydroxide form. A major portion of the finely divided resin particles employed in System D, on a weight basis, comprised particles in the size range of 200 to 400 mesh.

Condensate water from the commercial steam generating system for the turbines of a commercial electric power plant was employed as the influent water in all the tests. The condensate water had the folowing contaminants:

|  | P.p.b. |
|---|---|
| Total copper | 2–35 |
| Total iron | 5–100 |
| Dissolved silica | 5–60 |
| Colloidal silica | 30–50 |
| Chloride ion | 500–10,000 |

The impurity content of the condensate water varied during each test within the above ranges. Each test of Systems A, B, C and D was run until the conductivity of the effluent increased by 0.5 mmho., indicating that the resin particles in the system had become ineffective. Each test of System E was terminated when the pressure drop across the filter screen and pre-coat layer had exceeded 20 p.s.i.

The flow rates, pressure drop and other operating conditions and the results of the tests are summarized in Table A below:

TABLE A.—WATER CONDENSATE TREATMENT

| System | A Conventional Mixed-Bed | B Shallow Mixed-Bed | C Filter Screen Pre-coated with Large Bead Resin | D Filter Screen Pre-coated with Finely Divided Resin | E Filter Screen Pre-coated with cellulose [1] |
|---|---|---|---|---|---|
| Flow rate, g.p.m./sq. ft. of cross-sectional area of bed or pre-coat layer | 30–50 | 10–20 | 2–5 | 2–5 | 2–5 |
| Bed or pre-coat depth, inches | 30–48 | 12–18 | 1/2–1 | 1/4–1/2 | 1/4–1/2 |
| Avg. pressure drop, p.s.i. | 20–30 | 10–15 | 5–20 | 5–20 | 5–20 |
| Weight ratio of anion resin to cation resin | 1:1 | 1:1 | 1:1 | 1:1 | |
| Resin particles size range, mesh | 20–50 | 20–50 | 20–50 | 60–400 | |
| Percent dissolved iron removed | 50 | 50 | 5 | 50 | 0 |
| Percent total iron removed | 70 | 70 | 30–40 | 85–90 | 60 |
| Percent dissolved copper removed | 60 | 60 | 5 | 60 | 0 |
| Percent total copper removed | 80 | 80 | 30–40 | 90–95 | 60 |
| Percent chloride ion removed | 99.9+ | 98+ | 30–40 | 98+ | 0 |
| Percent dissolved silica removed | 60 | 40 | 10 | 75 | 0 |
| Percent total silica removed | 60 | 40 | 10 | 90 | 40 |
| Percent ion exchange capacity utilized | 15–30 | 15–30 | 5–10 | 30–60 | |

[1] Cellulose was 70 micron size.

It will be seen from Table A that System D, comprising a filter screen with a pre-coat layer of resin particles in the size range of 60 to 400 mesh in accordance with the present invention, affords the greatest removal of iron, copper and silica of the systems tested. It should also be noted Systems A, B and C do not remove any undissolved silica, while System D removes a substantial amount of the undissolved silica as well as the dissolved silica. Furthermore, as seen from "percent ion exchange capacity utilized," System D makes more efficient use of the resin particles; that is, in System D a greater percentage of the available exchange sites on the resin particles is utilized than in other systems.

*Example III*

In Runs 1–4 of this example a purification system embodying the features of the present invention was employed. The apparatus was similar to that described in Example I. The filter screens were annular shaped, cotton-wound filters having an effective porosity of 2 micron size. The pre-coat layer of resin particles in the size range of 200 to 400 mesh was deposited on the upstream side (exterior surface) of the filters in the same manner described in Example I. The finely divided resin particles in Runs 1–4 were a mixture of anion and cation resins on a 1:1 weight basis and were of the divinylbenzene-styrene copolymer type.

In Run 5 the purification system comprised a conventional deep mixed-bed of anion and cation large bead resin particles in the size range of 20 to 50 mesh as used in Example II. The anion and cation resin particles were mixed in the ratio of 1:1 on a volume basis and were of the divinylbenzene-styrene copolymer type.

The cation resin particles in all the runs were in the hydrogen form, while the anion resin particles were in the hydroxide form.

The influent from Runs 1, 2, 4 and 5 was condensate water from the steam generating system for the turbines of a commercial electrical power plant. In Run 3 the influent was a "synthetic" condensate water made in the laboratory. The characteristics of the influent, operating conditions and the effluent are summarized in Table B below:

TABLE B.—CONDENSATE WATER TREATMENT

| Type of System | Filter Screen with Pre-coat Layer of Resin Particles | | | | Conventional Deep Mixed Bed |
|---|---|---|---|---|---|
| Run No. | 1 | 2 | 3 | 4 | 5 |
| Bead or pre-coat depth, inches | ½–⅝ | ½–⅝ | ½–⅝ | ¾₆ | 36 |
| Flow rate, g.p.m./ft.² | 1.5 | 5.0 | 5.0 | 5.0 | 30 |
| Pressure drop, p.s.i. | <2 | <3 | <3 | <2 | 9–11 |
| Influent: | | | | | |
| Cond., mmhos | 2.7 | 2.7 | 10.0 | 2.2 | 12 |
| Soluble silica, p.p.b. | 64 | 64 | 280 | 50 | 40 |
| Colloidal silica, p.p.b. | 53 | 53 | 110 | 57 | |
| Iron, p.p.b. | 45 | 45 | 400 | 30 | |
| Effluent: | | | | | |
| Cond., mmhos | 0.15 | 0.1 | 0.2 | 0.1 | 0.25 |
| Soluble silica, p.p.b. | 5 | <3 | <10 | 3.5 | 12–16 |
| Colloidal silica, p.p.b. | 11 | 8 | 11 | 6 | |
| Iron, p.p.b. | <2 | <3 | <10 | <2 | |

The advantages of the present invention are evident from a comparison of the effluents obtained in Runs 1–4 with the effluent obtained in Run 5. The low conductivity of the effluent in Runs 1–4 indicates the effective removal of soluble salts also present in the influents. Furthermore, the soluble silica removed in Runs 1–4 was far greater than the soluble silica removed in Run 5.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. The method of removing impurities from a liquid which comprises pre-coating a filter screen by depositing upon said filter screen a layer of ion exchange resin particles in the size range of about 60 to 400 mesh and passing said liquid through said pre-coat layer and said filter screen.

2. The method of removing impurities from a liquid which comprises suspending in a slurry liquid ion exchange resin particles in the size range of about 60 to 400 mesh, pre-coating a filter screen by circulating said slurry liquid through said filter screen, said filter screen having a sufficiently fine mesh to allow said resin particles to deposit thereon, and passing said liquid through said deposited resin particles and said filter screen.

3. The method of removing dissolved and undissolved impurities from water which comprises suspending ion exchange resin particles in the size range of about 60 to 400 mesh in a slurry water, pre-coating a filter screen by circulating said slurry water through said filter screen, said filter screen having apertures sufficiently small to allow said resin particles to deposit on said filter screen and form a layer having a depth in the range of about ¹⁄₁₆ to 2 inches, and passing said water through said deposited resin particle layer and said filter screen.

4. The method of claim 1 wherein said ion exchange resin particles are in the size range of about 100 to 400 mesh.

5. The method of claim 1 wherein said ion exchange resin particles are in the size range of about 200 to 400 mesh.

6. An apparatus for removing impurities from a liquid comprising a filter screen and a layer of ion exchange resin particles in the size range of about 60 to 400 mesh deposited upon said filter screen, and means for passing said liquid through said layer of resin particles and filter screen.

7. The apparatus of claim 6 wherein said ion exchange resin particles are in the size range of about 100 to 400 mesh.

8. An apparatus for removing impurities from water comprising a filter screen and a layer of ion exchange resin particles deposited upon the upstream side of said filter screen, said layer having a depth in the range of about ¹⁄₁₆ to 2 inches and comprising resin particles in the size range of about 60 to 400 mesh, and means for passing said water through said layer and filter screen.

9. A filter comprising a filter screen having an upstream and downstream side, said upstream side of said filter screen having a layer of pre-coat medium thereon, said pre-coat medium comprising ion exchange resin particles in the size range of about 60 to 400 mesh.

10. The filter of claim 9 wherein said layer of pre-coat medium has a thickness in the range of about ¹⁄₁₆ to 2 inches.

11. The filter of claim 9 wherein a major portion by weight of said layer comprises resin particles in the size range of about 100 to 400 mesh.

12. The filter of claim 9 wherein a major portion by weight of said layer comprises resin particles in the size range of about 200 to 400 mesh.

13. A filter comprising a filter screen having an upstream and downstream side and a layer consisting essentially of ion exchange resin particles in the size range of about 60 to 400 mesh, said layer of resin particles being adjacent said upstream side of said filter screen.

14. The method of removing impurities from a liquid which comprises pre-coating a filter screen by depositing upon said filter screen a layer of ion exchange resin particles in the size range of about 60 to 400 mesh, a major portion by weight of said resin particles being in the size range of about 200 to 400 mesh, and passing said liquid through said pre-coat layer and said filter screen.

15. The method of removing from a liquid impurities not exceeding about 10 p.p.m. which comprises pre-coating a filter screen by depositing upon said filter screen a 1/16 to 2 inch thick layer of ion exchange resin particles in the size range of about 60 to 400 mesh and passing said liquid through said pre-coat layer and said filter screen.

16. The method of removing impurities from condensate water of a steam generating system which comprises pre-coating a filter screen by depositing upon said filter screen a layer of ion exchange resin particles in the size range of about 60 to 400 mesh, said layer having a thickness in the range of about 1/16 to 2 inches thick, and passing said condensate water through said pre-coat layer and filter screen.

17. The method of reducing impurities not exceeding about 10 p.p.m. in a condensate water of a steam generating system to below about 20 p.p.b. which comprises pre-coating a filter screen by depositing upon said filter screen a 1/16 to 2 inch thick layer of ion exchange resin particles in the size range of about 60 to 400 mesh and passing said condensate water through said pre-coat layer and filter screen.

References Cited by the Examiner
UNITED STATES PATENTS

| | | | |
|---|---|---|---|
| 2,952,363 | 9/1960 | Griswold | 210—193 |
| 3,132,094 | 3/1964 | McKelvey et al. | 210—500 |

OTHER REFERENCES

Article in Diatomite, "Filtration of Potable Water," Dicalite Division, Great Lakes Carbon Corporation, 612 S. Flower St., Los Angeles 17, Calif.

MORRIS O. WOLK, *Primary Examiner.*